United States Patent
Malmqvist et al.

(10) Patent No.: US 6,946,074 B2
(45) Date of Patent: Sep. 20, 2005

(54) METHOD FOR BIOLOGICAL CLEANING OF WASTEWATER

(75) Inventors: Asa Malmqvist, Lomma (SE); Thomas Welander, Furulund (SE)

(73) Assignee: Kaldnes Miljøteknologi, Tønsberg (NO)

( * ) Notice: Subject to any disclaimer, the term of this patent is extended or adjusted under 35 U.S.C. 154(b) by 542 days.

(21) Appl. No.: 10/055,936

(22) Filed: Jan. 28, 2002

(65) Prior Publication Data

US 2002/0179524 A1 Dec. 5, 2002

(30) Foreign Application Priority Data

May 25, 2000 (SE) .............................................. 0002024

(51) Int. Cl.$^7$ ................................................ C02F 3/00
(52) U.S. Cl. ........................ 210/615; 210/622; 210/610
(58) Field of Search ................................ 210/615–619, 210/620, 220, 622, 610

(56) References Cited

U.S. PATENT DOCUMENTS

| 4,999,111 A | 3/1991 | Williamson |
| 5,976,375 A | 11/1999 | Dorica et al. |

FOREIGN PATENT DOCUMENTS

| EP | 0776863 A1 | 6/1997 |
| JP | 51020471 | 2/1976 |
| JP | 6190396 | 7/1994 |
| WO | WO 9839254 A1 | 9/1998 |

Primary Examiner—Chester T. Barry

(57) ABSTRACT

A method for biological purification of wastewater is disclosed, wherein the wastewater is purified in a biofilm process followed by an activated sludge process. The biological degradation in the biofilm process is performed under limitation of one of the nutrient salts nitrogen or phosphorous, and the surplus sludge from the biofilm process is allowed to pass to the activated sludge process.

6 Claims, 1 Drawing Sheet

METHOD FOR BIOLOGICAL CLEANING OF WASTEWATER

Figure 1:
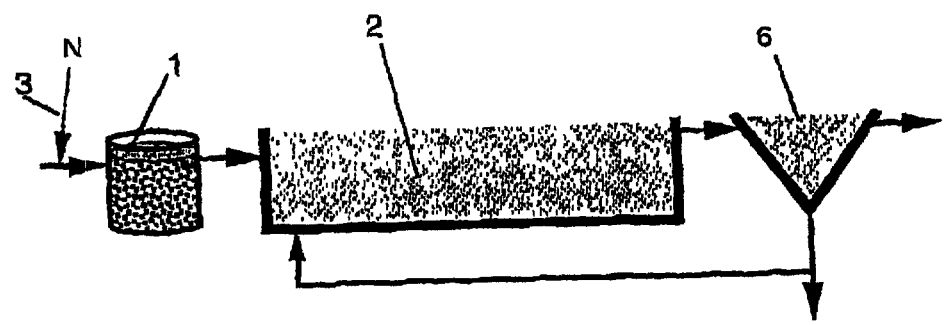

The invention relates to a method for biological purification of wastewater wherein the wastewater is purified first in a biofilm process, and then in an activated sludge process all surplus biomass from the biofilm process, or the main part thereof, being allowed to pass to the activated sludge process. This has been found to provide great advantages as compared with prior art methods.

In biological wastewater purification the wastewater is passed through some type of reactor, tank, or basin wherein micro-organisms are utilized for converting impurities existing in the water, to harmless end products such as carbon dioxide and water. The purification i.a. can be performed under supply of air (aerobically) or without supply of air (anaerobically). In all biological purification processes some of the degraded impurities are converted into microbial biomass, a biosludge, which must be separated from the water and removed from the process, dewatered, and cleared off in some way, usually by dumping or combustion. Handling of the sludge in connection with biological purification involves large operating costs and it is therefore desired to have a sludge production as low as possible in the biological process.

In order to obtain an extensive degradation of the organic impurities in the wastewater and to make the processes more compact biological purification processes are often used wherein the active micro-organisms are retained in the process in order to maintain a high content of active biomass. There are two main principles for the retention. Either the biomass is allowed to grow in suspended form in the process and is then separated from the water in a separation step after the reactor and is returned to the reactor (activated sludge processes), or the biomass is retained by allowing the micro-organisms to grow as a biofilm on some type of carrier material included in the process (biofilm processes). It is also common to combine biofilm processes and activated sludge processes such that the wastewater is treated first in a biofilm process, for example a so-called biobed, and then in an activated sludge process. This results in a more compact and for disturbances more insensitive process than a pure active sludge process, a more extensive purification at the same time being obtained than usually can be obtained with a pure biofilm process.

In biofilm processes as well as activated sludge processes and combined processes surplus biomass corresponding to the sludge production in the system must be removed from the process.

In order that the biological process shall function it is required that certain amounts of biologically available nitrogen and phosphorus are available. These nutrient substances are a life necessity in the microbial biomass and exist there in cellular components as proteins, nuclein acids and phospholipids. Microbial biomass normally contains about 10% nitrogen and 1.5% phosphorus which is taken up from the surroundings under degradation of organic material and growth of new biomass. Wastewater which contains low levels of biologically available nutrient salts in relation to the degradable organic material (measured for example as biochemical oxygen consumption, $BOD_5$), usually must be supplied with extra nitrogen and/or phosphorus in order to obtain good purification results. A common rule of thumb for aerobic biological purification is that the wastewater must have a quantity relationship between $BOD_5$, nitrogen (N) and phosphorus (P) of about 100:5:1 in order that the purification shall function optimally. When dosing nitrogen and phosphorus to the purification process easily available compounds such as ammonium, nitrate, urea, and orthophosphate, are often used. For wastewater having a low natural content of nutrient salts the supply of nutrient salts often is one of the largest items of operating costs.

When there is a lack of available nutrient salts in the biological purification problems usually arise such as incomplete degradation of organic material and bad separation and dewatering properties of the biosludge. Lack of nutrient salt in an activated sludge process often results in a heavy growth of filament forming bacteria which cause sludge separation problems in the form of so-called sludge swelling, while lack of nutrient salt in a biofilm process can create large amounts of finely suspended biomass which is very difficult to separate.

The present invention relates to a method of the kind referred to above which according to claim 1 is characterized in that the biological degradation process in the biofilm process is effected under limitation of one of the nutrient salts nitrogen and phosphorus, by the quotient between the amounts of $BOD_5$ and biologically available nitrogen supplied to the biofilm process being kept within the interval from 60:1 to 240:1, preferably within the interval from 80:1 to 180:1, particularly within the interval from 100:1 to 150:1, and/or the quotient between the amounts of $BOD_5$ and biologically available phosphorus being kept within the interval from 300:1 to 1200:1, preferably within the interval from 450:1 to 900:1, particularly within the interval from 500:1 to 700:1. This method thus combines the treatment of wastewater in a biofilm process, followed by an activated sludge process, with operation of the biofilm process under heavy limitation of nutrient salt, which unexpectedly has been found to provide great advantages as far as the process is concerned. The biomass which is formed in the biofilm process under such conditions has been found to be easily degraded in the following active sludge process, which results in a very low biosludge production in the total combined process. By the degradation of the biofilm biomass in the activated sludge step some nutrient salts are released which can be utilized by the activated sludge. In most cases these released nutrient salts have been found to be sufficient for the activated sludge process, which means that the demand for nutrient salt for the total process will be very low as compared with conventional processes. In the cases wherein extra nutrient salts are required in the active sludge process dosing of nitrogen and/or phosphorus can be effected directly to the active sludge basin. In addition to low sludge production and low consumption of nutrient salts the method of the invention has been found to impart to the biosludge very good separation and dewatering properties. Due to the low sludge production the so-called sludge age in the process is also increased, which means that: a more far-reaching degradation of the organic material can be achieved by the method of the invention than in a conventional method having the same total process volume. Good sludge separation properties and no surplus of nutrient salts together provide very low nutrient salt discharge to the recipient.

In order to obtain the great advantages of the invention it has been found to be necessary that one of the nutrient salts nitrogen or phosphorus is present in a large deficit in relation to the degradable material in the biofilm process. At such limitation the reduction of organic material in the biofilm process will be slightly reduced, but great advantages as described above will be achieved by the change of the character of the surplus biomass, which is obtained. At a too large deficit of a nutrient salt the reduction will be reduced too much so that the positive effect will be lost. It has been found that the relationship between the amounts of $BOD_5$ and biologically available nitrogen in the biofilm process should be within the interval from 60:1 to 240:1, preferably within the interval from 80:1 to 180:1, particularly within the interval from 100:1 to 150:1, and/or the relationship between the amounts of $BOD_5$ and biologically available phosphorus in the biofilm process should be within the interval from 300:1 to 1200:1, preferably within the interval from 450:1 to 900:1, particularly within the interval from 500:1 to 700:1. Since the method of the invention requires a considerable deficit of a, nutrient salt in the biofilm process it is not suitable for wastewater which naturally contains higher nutrient salt levels than those defined by the intervals above, for example most municipal wastewaters. In most industrial wastewaters one of the nutrient salts nitrogen and phosphorus are present at a low level in relation to BOD. By the supply of a measured amount of nutrient salt such that a relationship between BOD and nitrogen or phosphorus as defined above is obtained, the operational advantages of the method of the invention can be achieved for these wastewaters.

In some cases the degradation of the surplus biomass from the biofilm process in the activated sludge process can be so effective that released nutrient salts provide a surplus of nutrient salts in the activated sludge process. In order to reduce the discharge of nutrient salts and to reduce the consumption of nutrient salts it is possible in such cases to return a part of the flow of outgoing wastewater from the separation step of the activated sludge process to the biofilm process. In this manner released nutrient salts can be returned and the dosage of new nutrient salts to the biofilm process be reduced, which also results in reduced discharge of nutrient salts.

In order to obtain best results by the method of the invention it has also been found that the biofilm process should be operated at a load within an interval from 2 to 20 kg $BOD_5$ per $m^3$ process volume and twentyfour hours, preferably within the interval from 3 to 15 kg $BOD_5/m^3$ and twentyfour hours, particularly within the interval from 4 to 1.0 kg $BOD_5/m^3$ and twentyfour hours.

Within the scope of the invention the biofilm process can be realized in many other ways and can be divided into several partial steps. However, the so-called biofilm process with suspended carrier material has been found to be particularly favourable for the function of the invention. In this process the carrier material is kept in suspension and movement in the process by the supply of air. By this arrangement the method of the invention can be made particularly compact as compared with the utilization of other types of biofilm processes.

A comparison between the method of the invention and the treatment of wastewater in a biofilm process or an activated sludge process individually or a combination between biofilm process and activated sludge process with normal dosing of nutrient salt shows that the method of the invention provides a considerably better result than other processes as will be seen from TABLE 1. The tests were performed on wastewater from a forest industry, and as will be seen from the table the production of surplus sludge was dramatically lower with the method of the invention than with conventional methods, as well as the consumption of nitrogen and phosphorus. Moreover, a slightly increased reduction of COD was achieved due to the increased sludge age in the process, and the nutrient salt discharge was kept at a lower level than in any of the other processes.

TABLE 1

Comparison between the purification result in activated sludge process, biofilm process, and combined biofilm/activated sludge process with normal dosing of nutrient salt and low dosing according to the invention, respectively

|  | Activated sludge | Biofilm | Biofilm/ activated sludge conventional | Biofilm/ activat. sludge low nutr. salt |
|---|---|---|---|---|
| Dwelling time (h) | 20 | 8 | 3 + 8 | 3 + 8 |
| COD-reduction (%) | 72 | 65 | 71 | 75 |
| Sludge production (kg dry substance/kg reduced COD) | 0.21 | 0.28 | 0.16 | 0.05 |
| Nitrogen consumption (gN/kg reduced COD) | 15 | 25 | 15 | 3 |
| Phosphorus consumption (gP/kg reduced COD) | 2 | 5 | 2 | 0.5 |
| Sludge volume index (ml/g) | 120 | 80 | 70 | 50 |
| Outgoing total nitrogen (mg/l) | 6 | 13 | 8 | 4 |
| Outgoing total phosphorus (mg/l) | 0.7 | 2 | 1.4 | 0.4 |

Figure 2:
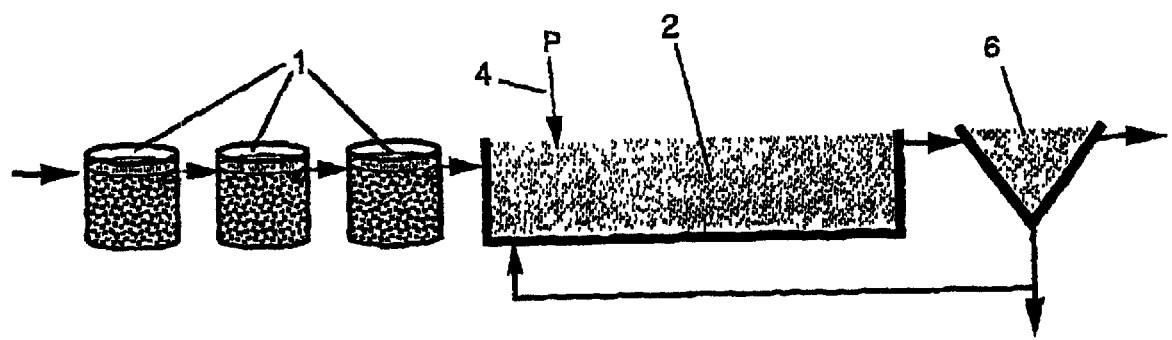
Figure 3:
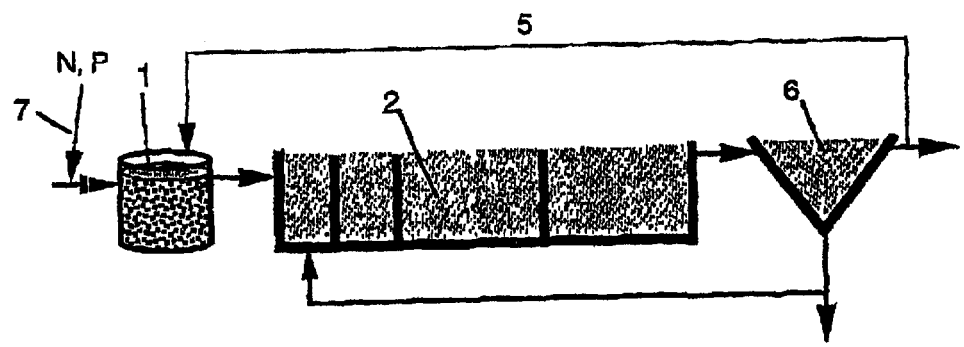

In order to explain the invention in more detail reference is made to the accompanying drawing which discloses illustrative embodiments of the invention, wherein FIG. 1 discloses an embodiment of the invention wherein the wastewater is treated in an aerated biofilm process, FIG. 2 discloses the same process combination as in FIG. 1 but with the biofilm process divided into three partial steps, and FIG. 3 discloses the same process combination as in FIG. 1 but with the activated sludge process divided into several partial steps.

In the embodiment according to FIG. 1 the wastewater is treated in an aerated biofilm process 1 with suspended carrier material, from which wastewater without separation of surplus biomass is passed to an activated sludge process 2. The wastewater which originally contains 600 mg/l $BOD_5$, 2 mg/l biologically available nitrogen in the form of ammonia, and 1 mg/l biologically available phosphorus in the form of orthophosphate, is supplied with extra nitrogen at 3 to a total content available nitrogen of 5 mg/l in order that optimal conditions according to the invention shall be obtained. No extra phosphorus was supplied. To the activated sludge process 2 a sedimentation step 6 is connected, and concentrated sludge from this step is supplied to the activated sludge process 2.

In the embodiment according to FIG. 2 the biofilm process 1 has been divided into three partial steps. The wastewater contains originally 2000 mg/l $BOD_5$, 250 ml/l biologically available nitrogen, and 2 mg/l biologically available phosphorus. The wastewater is treated in the biofilm process 1 without supply of extra nitrogen and phosphorous while on the contrary extra phosphorus is dosed at 4 to the activated sludge process 2 in order to avoid lack thereof.

In the embodiment according to FIG. 3 the activated sludge process 2 is divided into several partial steps and a partial flow 5 of outgoing water from the separation step 6 is returned to the biofilm process 1 so that nutrient salts released in the active sludge process 2 are partly returned to the biofilm process and the need of extra supply of nutrient salt to the biofilm process is reduced. The return takes place at a flow which equals the inflow of untreated wastewater. The wastewater contains originally 900 mg/l $BOD_5$, 3 mg/l biologically available nitrogen and 0.5 ml/l biologically available phosphorus. Extra nitrogen and phosphorus is supplied to the wastewater at 7 to totally available contents of 5 mg/l nitrogen and 1 mg/l phosphorus.

We claim:

1. A method for biological purification of wastewater wherein the wastewater is purified first in a biofilm process and then in an activated sludge process all surplus biomass from the biofilm process or the main portion thereof is allowed to pass to the activated sludge process, wherein the biological degradation process in the biofilm process is operated under limitation of one of the nutrient salts, nitrogen or phosphorous by the quotient between the amounts of $BOD_5$ and biologically available nitrogen supplied to the biofilm process. Being kept within the interval from 60:1 to 240:1, preferably within the interval from 80:1 to 180:1, particularly within the interval from 100:1 to 150:1 and/or the quotient between the amounts of $BOD_5$ and biologically available phosphorus supplied to the biofilm process being kept within the interval from 300:1 to 1200:1, preferably within the interval from 450:1 to 900:1, particularly within the interval from 500:1 to 700:1.

2. The method according to claim 1, wherein the biofilm process is operated at a load within the interval from 2 to 20 kg $BOD_5$ per $m^3$ process volume and 24 hours, preferably within the interval from 3 to 15 kg $BOD_5$ per $m^3$ process volume and 24 hours, particularly within the interval from 4 to 10 kg $BOD_5$ per $m^3$ process volume and 24 hours.

3. The method according to claim 1, wherein the biofilm process is arranged such that the carrier material for microbial growth in the process is kept completely or partially in suspension and movement by the supply of air to the process.

4. The method according to claim 1, wherein a partial flow of outgoing wastewater from the separation step of the active sludge process is returned to the biofilm process.

5. The method according to claim 1, wherein further biologically available nitrogen and/or phosphorus is dosed directly to the activated sludge process.

6. The method according to claim 1, wherein the biofilm process is performed in at least two steps.

* * * * *